(12) United States Patent
Lentini et al.

(10) Patent No.: US 7,877,463 B2
(45) Date of Patent: Jan. 25, 2011

(54) METHOD AND SYSTEMS FOR PROVIDING ACCESS TO DYNAMIC CONTENT VIA STATIC PAGES

(75) Inventors: Russell P. Lentini, San Jose, CA (US); Goutham P. Rao, San Jose, CA (US); Timothy Regovich, Moorestown, NJ (US); Terence M. Weaver, Woking (GB)

(73) Assignee: Citrix Systems, Inc., Fort Lauderdale, FL (US)

( * ) Notice: Subject to any disclaimer, the term of this patent is extended or adjusted under 35 U.S.C. 154(b) by 382 days.

(21) Appl. No.: 11/365,482

(22) Filed: Mar. 1, 2006

(65) Prior Publication Data

US 2006/0206589 A1    Sep. 14, 2006

Related U.S. Application Data

(63) Continuation of application No. 11/246,922, filed on Oct. 7, 2005, now abandoned, which is a continuation-in-part of application No. 10/016,689, filed on Dec. 5, 2001, now Pat. No. 7,290,061.

(60) Provisional application No. 60/283,058, filed on Apr. 10, 2001.

(51) Int. Cl.
    *G06F 15/16* (2006.01)
    *G06F 15/173* (2006.01)
(52) U.S. Cl. .................. 709/219; 709/217; 709/223
(58) Field of Classification Search ................ 709/223, 709/224, 217, 219
    See application file for complete search history.

(56) References Cited

U.S. PATENT DOCUMENTS

| | | | |
|---|---|---|---|
| 6,289,382 B1 | 9/2001 | Bowman-Amuah |
| 6,332,163 B1 | 12/2001 | Bowman-Amuah |
| 6,339,832 B1 | 1/2002 | Bowman-Amuah |
| 6,434,568 B1 | 8/2002 | Bowman-Amuah |
| 6,434,628 B1 | 8/2002 | Bowman-Amuah |
| 6,438,594 B1 | 8/2002 | Bowman-Amuah |
| 6,442,748 B1 | 8/2002 | Bowman-Amuah |
| 6,477,580 B1 | 11/2002 | Bowman-Amuah |
| 6,477,665 B1 | 11/2002 | Bowman-Amuah |
| 6,496,850 B1 | 12/2002 | Bowman-Amuah |
| 6,502,213 B1 | 12/2002 | Bowman-Amuah |
| 6,529,909 B1 | 3/2003 | Bowman-Amuah |
| 6,529,948 B1 | 3/2003 | Bowman-Amuah |
| 6,539,396 B1 | 3/2003 | Bowman-Amuah |
| 6,549,949 B1 | 4/2003 | Bowman-Amuah |
| 6,550,057 B1 | 4/2003 | Bowman-Amuah |
| 6,571,282 B1 | 5/2003 | Bowman-Amuah |
| 6,578,068 B1 | 6/2003 | Bowman-Amuah |
| 6,601,192 B1 | 7/2003 | Bowman-Amuah |
| 6,601,234 B1 | 7/2003 | Bowman-Amuah |

(Continued)

*Primary Examiner*—Hussein A Elchanti
(74) *Attorney, Agent, or Firm*—Foley and Lardner LLP; Christopher McKenna

(57) ABSTRACT

A system and method for providing access to dynamic content via static pages. A page or portion of a page is received containing at least one executable element and at least one static element. The at least one executable element is identified and then processed to produce output. A static page is created comprising the produced output. In some embodiments static elements linked to executable elements are replaced with static links referencing said executable elements. In other embodiments a page comprising a single form is created from a page comprising at least two forms.

43 Claims, 8 Drawing Sheets

U.S. PATENT DOCUMENTS

| | | |
|---|---|---|
| 6,606,660 B1 | 8/2003 | Bowman-Amuah |
| 6,615,199 B1 | 9/2003 | Bowman-Amuah |
| 6,615,253 B1 | 9/2003 | Bowman-Amuah |
| 6,636,242 B2 | 10/2003 | Bowman-Amuah |
| 6,640,238 B1 | 10/2003 | Bowman-Amuah |
| 6,640,244 B1 | 10/2003 | Bowman-Amuah |
| 6,640,249 B1 | 10/2003 | Bowman-Amuah |
| 6,715,145 B1 | 3/2004 | Bowman-Amuah |
| 6,742,015 B1 | 5/2004 | Bowman-Amuah |
| 6,842,906 B1 | 1/2005 | Bowman-Amuah |
| 6,988,135 B2 * | 1/2006 | Martin et al. ............. 709/224 |
| 7,191,400 B1 * | 3/2007 | Buvac et al. ............. 715/205 |

* cited by examiner

METHOD AND SYSTEMS FOR PROVIDING ACCESS TO DYNAMIC CONTENT VIA STATIC PAGES

RELATED APPLICATIONS

The present application claims priority to patent application Ser. No. 11/246,922 filed Oct. 7, 2005 titled "A Method and an Apparatus for Transforming Content from One Markup to Another Markup Language Non-Intrusively Using a Server Load Balancer and a Reverse Proxy Transcoding Engine" which is a continuation of patent application Ser. No. 10/123,098 filed Apr. 10, 2002, titled "A Method and an Apparatus for Transforming Content from One Markup to Another Markup Language Non-Intrusively Using a Server Load Balancer and a Reverse Proxy Transcoding Engine," which is itself a continuation-in-part of patent application Ser. No. 10/016,689 filed on Dec. 5, 2001 and which claims priority to Provisional Patent Application No. 60/283,058, filed on Apr. 10, 2001, all of which are commonly owned by the assignee of the present invention, and the entire contents of which are expressly incorporated herein by reference.

FIELD OF THE INVENTION

The present invention is directed to Internet and computer network content delivery methodologies and, more particularly, to systems and methods for the delivery of dynamic content.

BACKGROUND OF THE INVENTION

Content transmitted from a server to a client can be either dynamic or static. Static content typically does not include an executable element intended for execution by the client. Examples of static content include plain text, images, and standard form elements. Dynamic content typically includes an executable portion intended to be executed by the client, the executable portion usually serving to modify content or take some action in response to a user action. Often, an executable element will be linked with another content element for the purpose of modifying or updating that element in response to a user action. Examples of dynamic content include executable elements that populate or verify form entries, executable elements that alter content elements in response mouse actions, and executable elements that rewrite portions of a page for effective display in a given browser or window size.

For a number of reasons, a server may not wish to transmit dynamic content to a given client. The client may lack the capability to process dynamic content, lack the resources to process dynamic content efficiently, or have a preference against dynamic content. A server may also wish to conceal certain executable code and operations from the client due to concerns of piracy or security breaches. A server may wish to ensure that content is delivered in a uniform fashion across clients who may process a given executable element differently. However, even though a server may not wish to transmit dynamic content to a client, the server may still wish to gain certain benefits of dynamic content, such as form verification, interactivity, or user-specific responses.

Because of the large amount of pre-existing content that resides in dynamic form, it would be impractical for a server administrator to manually rewrite all dynamic content into static form for the above scenarios. Further, developing both static and dynamic methods for transmitting new content may also require considerable developer and administrator time.

Thus, there exists a need for automatically providing access to dynamic content via static pages, while preserving the functionality and information contained in the dynamic content.

SUMMARY OF THE INVENTION

The present invention provides a mechanism by which dynamic content can be delivered to a client in static form. The invention allows the interactivity, content, and functionality of dynamic content to be preserved in an environment that does not support or does not desire dynamic content viewing. Further, the invention automates this process of transforming dynamic content to static content, which enables the transformation to be accomplished with minimal developer resources or effort.

In one aspect, the invention relates to a method for delivering dynamic content via static pages. The method comprises receiving a page or portion of a page of content comprising at least one static element and at least one executable element; identifying at least one executable element; processing said at least one executable element to produce output; and creating a static page comprising the produced output.

In one embodiment, the page or portion of a page of content is received from a network. In another embodiment, the identifying at least one executable element comprises identifying at least one element comprising Javascript. In another embodiment, processing said at least one executable element to produce output comprises executing said executable element to produce output. In another embodiment, processing said at least one executable element to produce output comprises removing said executable element to produce output.

In another embodiment, the method comprises receiving a page or portion of a page of content comprising at least one element linked to an executable element; identifying at least one executable element; replacing said element linked to the executable element with a static link containing a reference to said executable element in the produced output; receiving an indication that said static link has been selected; identifying the executable element referenced by said link; executing said executable element to produce output; and creating a static page comprising the produced output.

In another aspect, the invention relates to a server system for providing access to dynamic content, said server system comprising: a storage buffer which receives a page or portion of a page of content comprising at least one static element and one executable element; and a processor in communication with said storage buffer which identifies said at least one executable element, processes said at least one executable element to produce output, and creates a static page comprising the produced output.

In one embodiment, the storage buffer receives the page or portion of a page of content from a network. In another embodiment, the processor identifies at least one executable element comprising Javascript. In another embodiment, the processor processes said at least one executable element to produce output by executing said executable element to produce output. In another embodiment, the processor processes said at least one executable element to produce output by removing said executable element to produce output.

In another embodiment, the server system comprises a storage buffer which receives a page or portion of a page of content comprising at least one element linked to an executable element; a processor which identifies at least one executable element; replaces said element linked to the executable element with a static link containing a reference to said executable element in the produced output; an input which receives an indication that said static link has been selected; and a processor that identifies the executable element referenced by said link, executes said executable element to produce output, and creates a static page comprising the produced output.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION OF THE INVENTION

Figure 1:
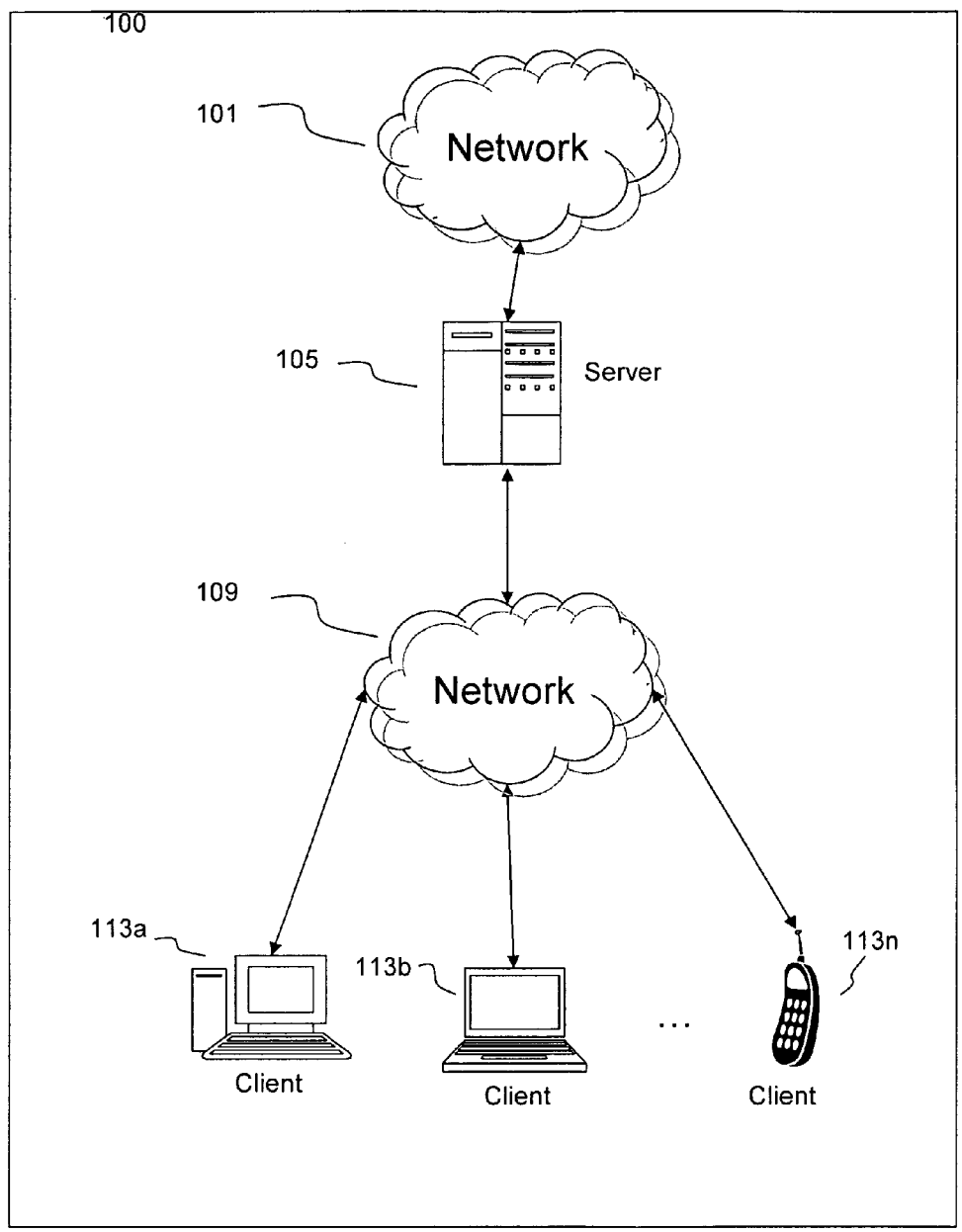
FIG. 1 is a block diagram illustrating an embodiment of a client-server network.

Referring now to FIG. 1, an example of a computer network 100 is shown. In brief overview, a server 105 communicates with a network 101 and with a number of clients 113a, 113b, 113n (collectively 113) over a second network 109.

The server 105 may comprise any device capable of processing information and sending and receiving information, including a standalone computer server, a blade server, a rack mounted server, or a group of any types of said servers.

In the embodiment shown, the server 105 is connected to networks 101, 109. The networks 101, 109 may comprise the Internet, local networks, web servers, file servers, routers, databases, computers, servers, network appliances, or any other computing devices capable of sending and receiving information. The networks 101, 109 may comprise computing devices connected via cables, IR ports, wireless signals, or any other means of connecting multiple computing devices.

The networks 101, 109 and any devices connected to the networks may communicate via any communication protocol used to communicate among or within computing devices, including without limitation SSL, HTML, XML, RDP, ICA, FTP, HTTP, TCP, IP, UDP, IPX, SPX, NetBIOS, NetBEUI, SMB, SMTP, Ethernet, ARCNET, Fiber Distributed Data Interface (FDDI), RS232, IEEE 802.11, IEEE 802.11a, IEE 802.11b, IEEE 802.11g and direct asynchronous connections, or any combination thereof. The networks 101, 109' may comprise mobile telephone networks utilizing any protocol or protocols used to communicate among mobile devices including AMPS, TDMA, CDMA, GSM, GPRS or UMTS. The networks 101, 109 may comprise physically distinct networks as shown in FIG. 1, or the networks may comprise the same network, and may be connected using any topology.

In embodiments comprising a TCP/IP based communications among any of the above devices, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. Any type and form of transport control protocol may also be used, such as a modified transport control protocol, for example a Transaction TCP (T/TCP), TCP with selection acknowledgements (TCPSACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used.

The server 105 may communicate with other servers via networks 101, 109. The server 105 may also communicate with one or more clients 113. In some embodiments, the server 105 communicates directly with the client 113. A client 113 may comprise a computer, a laptop computer, an internet kiosk, mobile device such as a PDA, mobile phone, or palmtop computer, or any other computing device capable of sending and receiving information. The client 113 may also comprise another application or applications executing on the same physical machine as the server 105.

Figure 2A:
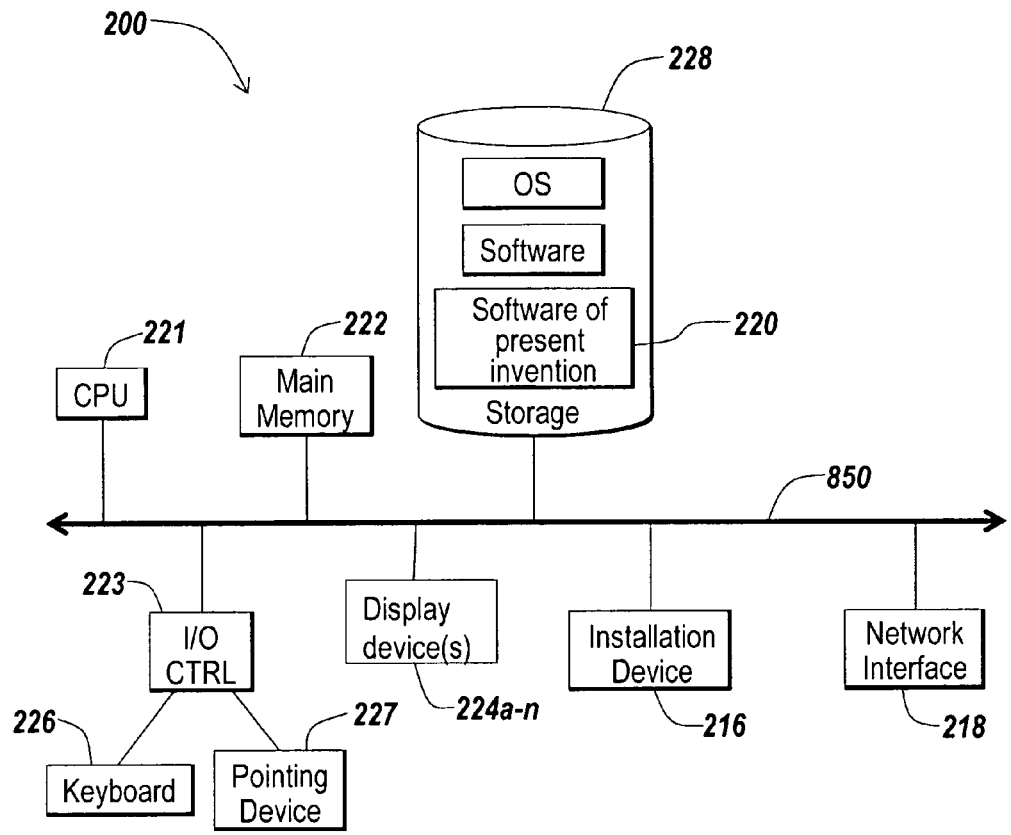
FIGS. 2A and 2B are block diagrams of embodiments of a computing or network device useful as a device in a client-server network.
Figure 2B:
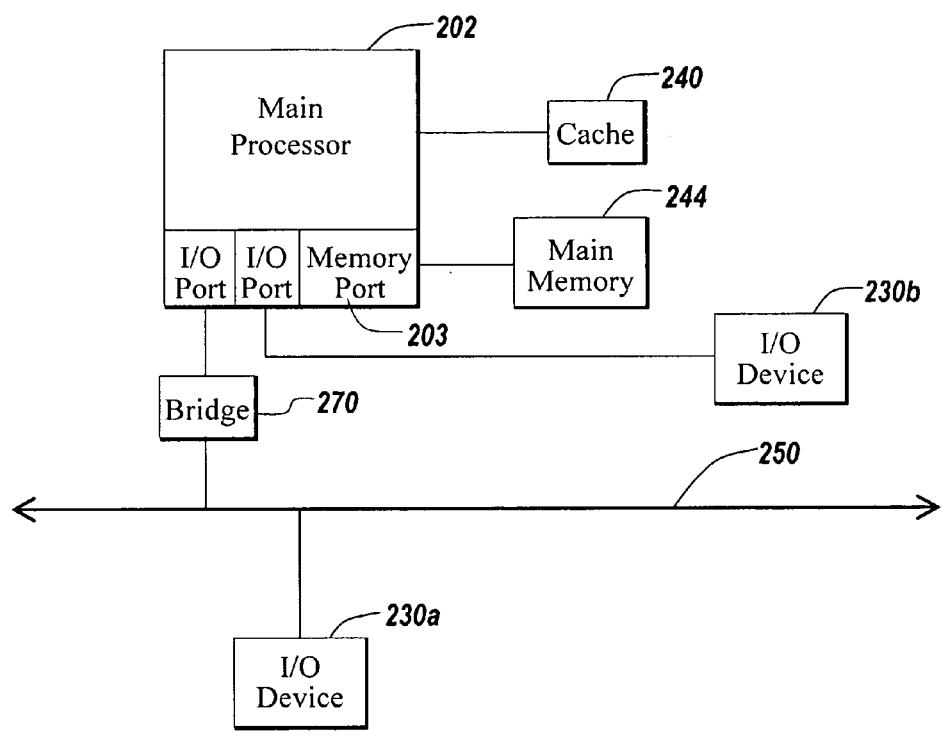

FIGS. 2A and 2B depict block diagrams of a typical computer 200 useful as client computing devices 113 and server computing devices 105. As shown in FIGS. 2A and 2B, each computer 200 includes a central processing unit 202, and a main memory unit 204. Each computer 200 may also include other optional elements, such as one or more input/output devices 230a-230-b (generally referred to using reference numeral 230), and a cache memory 240 in communication with the central processing unit 202.

The central processing unit 202 is any logic circuitry that responds to and processes instructions fetched from the main memory unit 204. In many embodiments, the central processing unit is provided by a microprocessor unit, such as those manufactured by Intel Corporation of Mountain View, Calif.; those manufactured by Motorola Corporation of Schaumburg, Ill.; the Crusoe and Efficeon lines of processors manufactured by Transmeta Corporation of Santa Clara, Calif.; the lines of processors manufactured by International Business Machines of White Plains, N.Y.; or the lines of processors manufactured by Advanced Micro Devices of Sunnyvale, Calif.

Main memory unit 204 may be one or more memory chips capable of storing data and allowing any storage location to be directly accessed by the microprocessor 202, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). In the embodiment shown in FIG. 2A, the processor 202 communicates with main memory 204 via a system bus 220 (described in more detail below). FIG. 2B depicts an embodiment of a computer system 200 in which the processor communicates directly with main memory 204 via a memory port. For example, in FIG. 2B the main memory 204 may be DRDRAM.

FIGS. 2A and 2B depict embodiments in which the main processor 202 communicates directly with cache memory 240 via a secondary bus, sometimes referred to as a "back-side" bus. In other embodiments, the main processor 202 communicates with cache memory 240 using the system bus 220. Cache memory 240 typically has a faster response time than main memory 204 and is typically provided by SRAM, BSRAM, or EDRAM.

In the embodiment shown in FIG. 2A, the processor 202 communicates with various I/O devices 230 via a local system bus 220. Various busses may be used to connect the central processing unit 202 to the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is an video display, the processor 202 may use an Advanced Graphics Port (AGP) to communicate with the display. FIG. 2B depicts an embodiment of a computer system 200 in which the main processor 202 communicates directly with I/O device 230b via HyperTransport, Rapid I/O, or InfiniBand. FIG. 2B also depicts an embodiment in which local busses and direct communication are mixed: the processor 202 communicates with I/O device 230a using a local interconnect bus while communicating with I/O device 230b directly.

A wide variety of I/O devices 230 may be present in the computer system 200. Input devices include keyboards, mice, trackpads, trackballs, microphones, and drawing tablets. Output devices include video displays, speakers, inkjet printers, laser printers, and dye-sublimation printers. An I/O device may also provide mass storage for the computer system 800 such as a hard disk drive, a floppy disk drive for receiving floppy disks such as 3.5-inch, 5.25-inch disks or ZIP disks, a CD-ROM drive, a CD-R/RW drive, a DVD-ROM drive, tape drives of various formats, and USB storage devices such as the USB Flash Drive line of devices manufactured by Twintech Industry, Inc. of Los Alamitos, Calif.

In further embodiments, an I/O device 230 may be a bridge between the system bus 220 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

General-purpose computers of the sort depicted in FIG. 2A and FIG. 2B typically operate under the control of operating systems, which control scheduling of tasks and access to system resources. Typical operating systems include: MICROSOFT WINDOWS, manufactured by Microsoft Corp. of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

For embodiments in which the client 113 is a mobile device, the device may be a JAVA-enabled cellular telephone, such as the i55sr, i58sr, i85s, or the i88s, all of which are manufactured by Motorola Corp. of Schaumburg, Ill.; the 6035 or the 7135, manufactured by Kyocera of Kyoto, Japan; or the i300 or i330, manufactured by Samsung Electronics Co., Ltd., of Seoul, Korea. A typical mobile device may comprise many of the elements described in FIGS. 2A and 2B, including the processor 202 and the main memory 204.

In other embodiments in which the client 113 is a mobile device, it may be a personal digital assistant (PDA) operating under control of the PalmOS operating system, such as the Tungsten W, the VII, the VIIx, the i705, all of which are manufactured by palmOne, Inc. of Milpitas, Calif. In further embodiments, the client 113 may be a personal digital assistant (PDA) operating under control of the PocketPC operating system, such as the iPAQ 4155, iPAQ 5555, iPAQ 1945, iPAQ 2215, and iPAQ 4255, all of which manufactured by Hewlett-Packard Corporation of Palo Alto, Calif.; the ViewSonic V36, manufactured by ViewSonic of Walnut, Calif.; or the Toshiba PocketPC e405, manufactured by Toshiba America, Inc. of New York, N.Y. In still other embodiments, the client 113 is a combination PDA/telephone device such as the Treo 180, Treo 270, Treo 600, Treo 650, or the Treo 700w, all of which are manufactured by palmOne, Inc. of Milpitas, Calif. In still further embodiments, the client 113 is a cellular telephone that operates under control of the PocketPC operating system, such as the MPx200, manufactured by Motorola Corp. A typical combination PDA/telephone device may comprise many of the elements described below in FIGS. 2A and 2B, including the processor 202 and the main memory 204.

Figure 3:
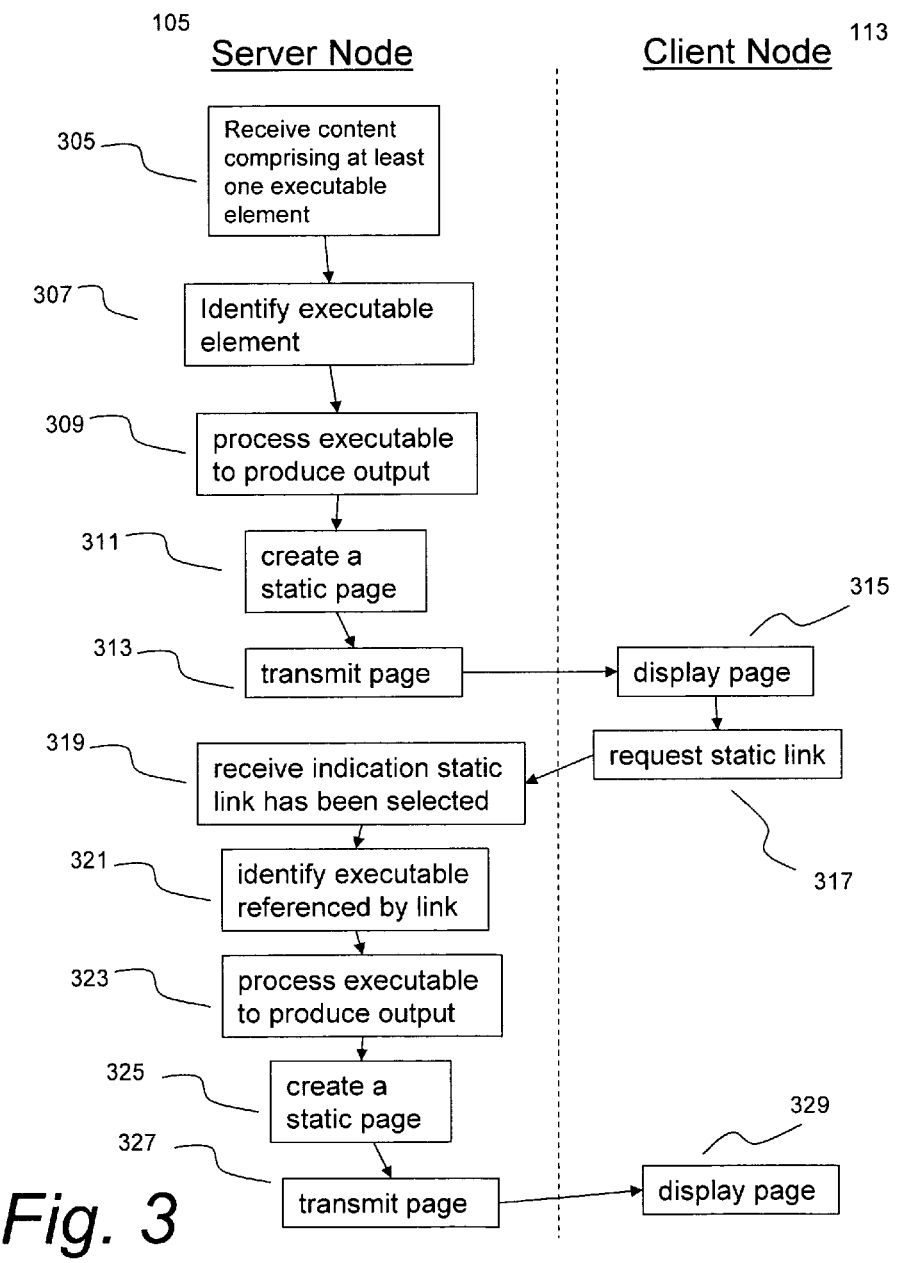
FIG. 3 is a flow diagram depicting one embodiment of a method to deliver dynamic content via static pages.

Referring now to FIG. 3, one embodiment of a method for providing access to dynamic content is shown. In brief overview, a server node 105 receives a page or portion of a page of content comprising at least one static element and at least one executable element (step 305). The server 105 identifies the at least one executable element (step 307). The server 105 then processes said at least one executable element to produce output (step 309) and creates a static page comprising the produced output (step 311). The server 105 transmits the created page to a client (step 313), and then receives an indication that a static link from the created page has been selected (step 319). The server 105 then identifies an executable element referenced by said static link (step 321), processes said executable element to produce output (step 323), and creates a static page comprising the produced output (step 325).

Still referring to FIG. 3, and in more detail, in one embodiment, the page or portion of a page of content comprising at least one static element and at least one executable element is received (step 305) from a network 101. In some embodiments, the page may be received from a file server, web server, application server, file system, database, or any combination thereof. In some embodiments, the page may be read from a disk or other storage media, retrieved from a cache, received from another application, or any combination thereof.

The page or portion of a page received may comprise HTML, XML, or any language or definition for specifying a page or portion of a page of content. The at least one executable element may be written in any executable scripting or coding language such as Javascript, Dynamic HTML, Ajax, Java, Flash, SVG or any other executable scripting or coding language. The static element may comprise any non-executable element of a page, including plain text, HTML, XML, input elements, an image file, or any other data or display element.

In some embodiments, the server 105 receives a page or portion of a page comprising at least one static element linked to an executable element. In some embodiments, this static element linked to an executable element may comprise an HTML or XML element with an associated Javascript or other executable element. In some embodiments, this association between the HTML or XML element and the executable element may comprise a reference to the executable element in the HTML or XML element's onmouseover, onmouseout, onclick, onsubmit, onfocus, onfocuslost, or onselect attribute. In other embodiments, this association between the HTML or XML element and the executable element may comprise any other format or notation indicating that said executable element should be accessed upon a given user or global event. In other embodiments, the static element linked to an executable element may comprise any other static element of a page with a format, notation, or convention indicating that said executable element should be accessed upon a given user or global event.

In other embodiments, the server 105 receives a page or portion of a page comprising an executable element and at least two forms. The forms may comprise HTML <form> elements or any other means for specifying sets of content and input elements that are intended to be treated as a unit for some purpose. In other embodiments the server may receive any combination of static elements linked to executable elements and multiple form elements.

After receiving the page or portion of a page of content (step 305), the server identifies the at least one executable element (step 307). In some embodiments, the server identifies the executable element (step 307) by recognizing tags specific to executable elements, including but not limited to Javascript tags, HTML <script> elements, XML tags, or tags inserted by the page creator to identify executable elements. In other embodiments this identification (step 307) may comprise other forms parsing the page content for functions, methods, scripts, binary files, or other executable content, such as syntax-checking, context sensing, or any other means of distinguishing executable elements from static elements.

After identifying the at least one executable element (step 307), the server 105 processes said at least one executable element to produce output (step 309). In some embodiments, the server 105 executes the executable element to produce output. In one embodiment, this execution may comprise executing Javascript. In other embodiments, this execution may comprise executing a function or script defined in the "onload" attribute of an HTML page. In some embodiments, the output produced by executing the executable element may comprise values for HTML <input> elements, HTML text, or HTML page formatting parameters. In other embodiments, the output produced may comprise a Javascript 'alert' dialog, or a dialog generated by any other scripting language. In other embodiments, the output produced may comprise a value indicating whether a given element or form has been correctly populated. In still other embodiments, the output produced may be a URL location. In still other embodiments, the output produced may be content accessed from another location, which may comprise a database, web server, file server, or any other location capable of transmitting content in response to a request from an executing script.

In some embodiments processing the executable element to produce output (step 309) may comprise removing the executable element. In some embodiments removal of the executable element (step 309) may comprise the complete excision of the executable element from the page or portion of a page. In other embodiments, removal may comprise enclosing the executable elements in comments, braces, brackets, or other means of indicating that the executable element is not intended to be executed. In still other embodiments removal of an executable element may comprise deleting references or links to an executable element from other elements of the page. In some embodiments, such deletion may comprise removing references to an executable element from HTML elements including <form>, <input>, <image>, or <href> elements, or any other HTML elements. In other embodiments, such deletion may also comprise removing references to an executable element contained in XML elements, or any other static elements containing references or links to an executable element. In still other embodiments, processing an executable element to produce output (step 309) may comprise any combination of executing an executable element and removing an executable element.

In some embodiments, processing of said at least one executable element may also comprise storing said executable element for later access. In some embodiments the server 105 may store the executable element such that the executable element can be accessed later in response to a client request. In some embodiments, the server 105 may store the executable element in a table with entries corresponding to pages accessed by a given client. In other embodiments, the server may store the executable element in a hash table with entries corresponding to the names of the executable element. In other embodiments, the sever 105 may store the executable element as part of a Document Object Model (DOM) for the said page or portion of a page received. The server 105 may store the DOM along with a unique client or session identifier such that the DOM and the executable element can be accessed in response to further client requests. In other embodiments, processing an executable element may comprise updating a stored DOM in response to either executing or otherwise processing said executable element. In still other embodiments the server may store a link to a location where the executable element can be accessed. In other embodiments the executable element may be stored along with a copy of the page or portion of a page of content received.

In some embodiments, processing of said least one executable element may also comprise sending and/or receiving a request. Said request may be transmitted over any of the networks or connections previously discussed, and may comprise any of the protocols previously discussed. Said request may be sent from or to any of the computing devices previously discussed. In some embodiments, the server 105 may send a request as part of executing the executable element. In some embodiments, the server may send an HTTP POST request to a server in order to pass along data previously received by the server in an HTTP POST request from the client 113. In other embodiments, the server may send any other type of request in response to data received from the client 113.

After processing said executable element to produce output (step 309), the server 105 creates a static page comprising the produced output (step 311). In some embodiments, creating a static page comprising the produced output (step 311) comprises creating a static page comprising the output produced from executing an executable element. In some embodiments, this static page may comprise all the elements from the original page or portion of a page, or the static page may comprise a subset of said elements. In some embodiments, the static page may comprise static elements that have been modified as a result of executing an executable element (step 309). In other embodiments, creating a static page comprising the produced output (step 311) comprises creating a static page comprising the output produced by removing an executable element. In still other embodiments, this creating a static page comprises removing links to executable elements. In some embodiments, the created page may comprise an HTML GET or POST request to be transmitted to a web server or other computing device. In some embodiments the created page may comprise an HTTP request for a resource from a web server or other computing device.

In some embodiments, creating a static page comprising the produced output (step 311) comprises replacing a static element linked to an executable element with a static link referencing said executable element. In some embodiments, said replacement comprises removing a link to an executable element from an HTML attribute, and inserting a static HTML link with an "href" attribute comprising notations allowing the server to identify said executable element upon receipt of an HTTP request for said link. In other embodiments, said replacement comprises removing a link to an executable element from an HTML attribute and also modifying the "action" attribute of an HTML <form> tag to comprise notations allowing the server to identify said executable element upon submission of said form.

In other embodiments, creating a static page comprising the produced output (step 311) comprises creating a static page comprising a combination of at least two forms. In some embodiments said creation comprises moving all form elements into a single form, and renaming all elements so as to avoid name collisions in the single form. Said renaming may comprise appending the name of the original form from which the form elements came to the beginning or end of each element name, or any other means of providing a unique identifier for each element. In some embodiments the form elements or attributes of the form elements may also be renamed such that the original form from which the form elements came can be easily identified.

After the static page is created (step 311), the page may then be transmitted (step 313) to a client 113. Such transmission may occur over any of the communication protocols discussed above, and over any of the connection means previously discussed.

The client 113 may then display, process, or otherwise handle the created static page (step 315). In some embodiments the client 113 may view the created static page with any HTML, WML, or XML browser. In some embodiments, the client 113 may view the created static page from within a mail client, document editor, or any other application used for viewing or processing content. In other embodiments the client 113 may process the created static page, such as with automated scripts.

The client 113 may then request a static link referencing an executable element (step 317). The client 113 may request the static link (step 317) as a result of a user clicking on a hypertext link in a standard web browser interface. The request may also occur as a result of a user clicking on an HTML button, checkbox, image, menu item, or any other HTML element in a web browser interface. The client 113 may request the static link (step 317) as a result of executing an automated script, a prefetch routine, or any other automatic means of requesting content prior, during, or after page display. The client 113 may transmit the request (step 318) to the server 105 via any of the communication protocols described herein, and via any of the networks or connections described herein.

The server then may receive an indication that a static link referencing an executable element has been selected (step 319). Said indication may occur over any of the communication protocols and networks previously discussed. In some embodiments such indication may comprise an HTTP request from the client 113 for said static link. In other embodiments the indication may comprise a message or notification from another computing device in communication with the client that the static link has been selected by the client. In some embodiments the notification that the link has been selected may be accompanied by other data including, without limitation, information in a POST, GET, or any other HTML request, URLs, information about client state, information about connection state, timestamps, headers, or any other information communicated from the client 113 or any intermediary between the client 113 and the server 105.

Upon receiving an indication that said static link referencing an executable element has been selected (step 319), the server may then identify the executable element referenced by said static link (step 321). In some embodiments, the server 105 may identify said executable element by parsing the URL of an HTTP request to determine a name or other unique identifier of said executable element. In some embodiments the server 105 may then retrieve said executable element from a table, list, database, or any other storage means discussed previously for storing either an executable element or a link to an executable element.

After identifying the executable element referenced by said static link (step 321), the server 105 may then process said executable element to produce output (step 323). Said processing may comprise any of the previously discussed embodiments of processing an executable element to produce output.

After processing said executable element to produce output (step 323), the server 105 may then create a static page comprising the produced output (step 325). The server 105 may create said static page according to any of the previously discussed embodiments for the creation of a static page comprising produced output.

After creating the static page (step 325), the server may then transmit the page (step 327) to the client 113. The transmission may occur via any of the previously discussed means for transmitting a page or portion of a page.

The page may then be displayed (step 329) by the client 113. The client may display the page or portion of a page using any of the previously discussed means for displaying a page or portion of a page.

Figure 4:
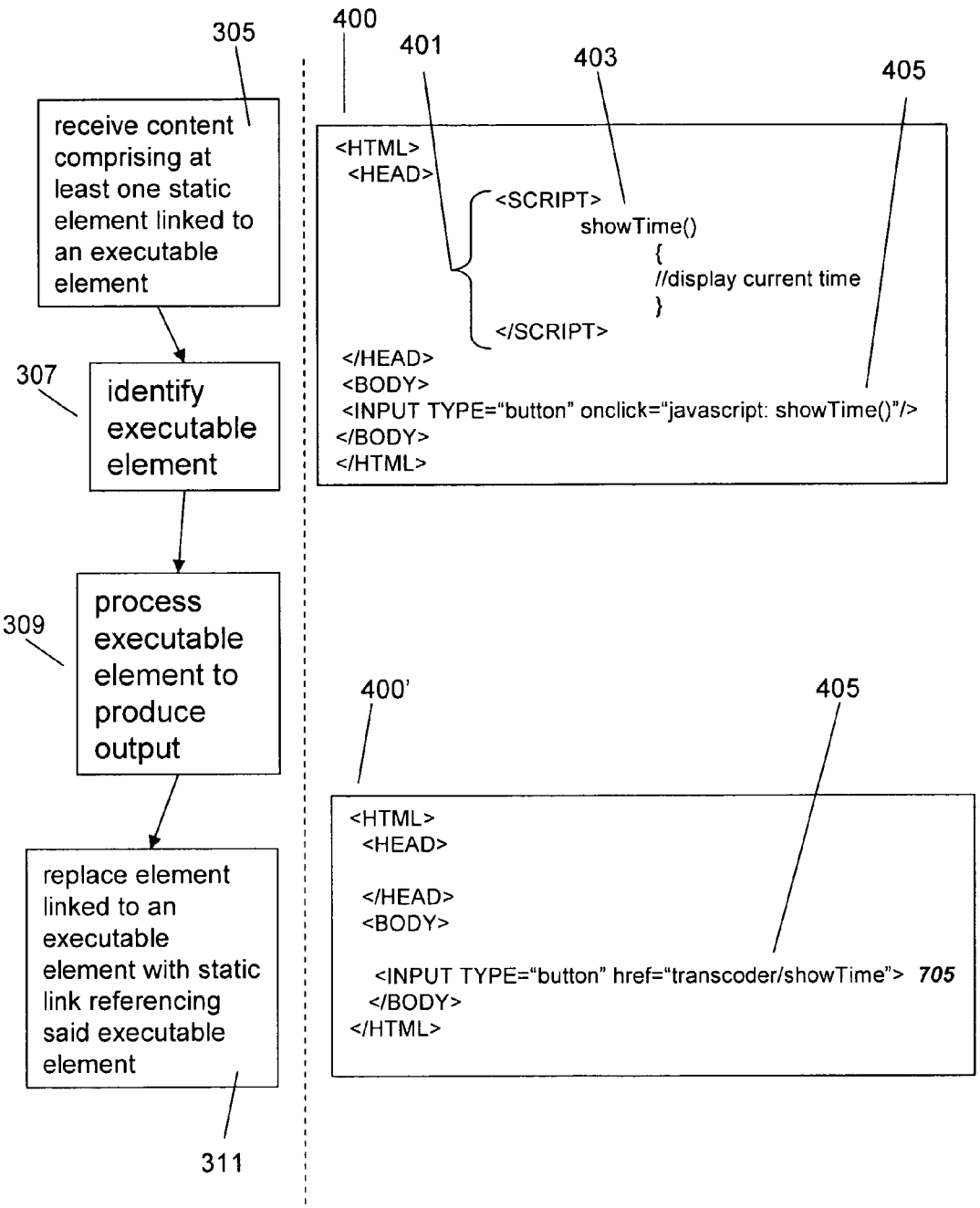
FIG. 4 is a detailed example of how dynamic content can be presented as a static page, and an accompanying flow diagram depicting the processing steps.

Referring now to FIG. 4, a detailed example of one embodiment of replacing a static element linked to an executable element with a static link referencing said executable element is shown. An initial HTML page 400 is shown. The page 400 comprises a script 401 containing a Javascript function 403, and an input button linked to the Javascript function 405. In a standard web browser, clicking the button 405 would cause the Javascript function 403 to execute and display the current time.

In the embodiment shown, the server 105 receives the page 400 comprising a static element linked to an executable element (step 305). The server 105 identifies the executable element 401 (step 307). The server 105 may identify the executable element 401 using any or all of the previously discussed methods for identifying an executable element. For example, in the embodiment shown in FIG. 4, the server 105 may parse the HTML page 400 to locate <SCRIPT> tags in the page.

In the embodiment shown, the server 105 then processes the executable element 401 to produce output (step 309). The processing comprises removing the executable element 401. The processing may also comprise storing a copy of said executable element 401 using any of the methods previously discussed such that the server can execute the Javascript function 403 later in response to a client request.

In the embodiment shown, the server 105 then creates a static page 400' comprising the produced output (step 311). The created static page 400' contains no executable element, as both the script tags 401 and the Javascript function 403 have been removed. The static element 405 linked to the Javascript function 403 has been replaced with a static HTML link 405' comprising a reference to said Javascript function. The reference to the Javascript function in the static link 405' includes the function name such that the server can identify the function that should be accessed if the server receives a request for the static link 411'. In the embodiment shown, said reference also comprises the word "transcoder" which may be used as a special tag to denote that the link 405' references an executable element.

Referring back to FIG. 3, the server 105 may then transmit the created page 400' to a client 113 (step 313). The client 113 may then display the page or portion of a page (step 315). The client may then request a static link referencing an executable element 405' (step 317). In the embodiment shown, when the link 405' is clicked in a standard browser, a request will be sent from the browser for the address of "transcoder/show-Time." (step 317)

In the embodiment shown in FIG. 4, the server 105 may then receive an indication that a static link has been selected (step 319). The server 105 may receive an HTTP GET request with an address of "transcoder/showTime."

In the embodiment shown in FIG. 4, the server 105 may then identify the executable element referenced by the requested link (step 321). Here, 'transcoder' is a word indicating that a link references an executable element. The server 105 can then recognize that the request comprising the word 'transcoder' is directed towards an executable element, and identify the specific executable element 403'. In the embodiment shown, the server may then parse the request to find the name of the referenced executable element—here showTime.

In the embodiment shown in FIG. 4, after identifying the referenced executable element (step 321) the server 105 may then process the executable element to produce output (step 323). The server 105 may execute the showTime function 403. The server 105 may also update and/or store any variables, elements, or other data associated with executing the showTime function 403.

In the embodiment shown in FIG. 4, the server 105 may then create a static page comprising the produced output (step 325). The server 105 may create a static page comprising a HTML element that will display the current time. The static page may comprise any or all of the elements comprising the first static page transmitted to the client (step 313).

In the embodiment shown in FIG. 4, the server 105 may then transmit the newly created static page to the client 113 (step 327). The client may then display the page showing the updated time (step 329).

Figure 5:
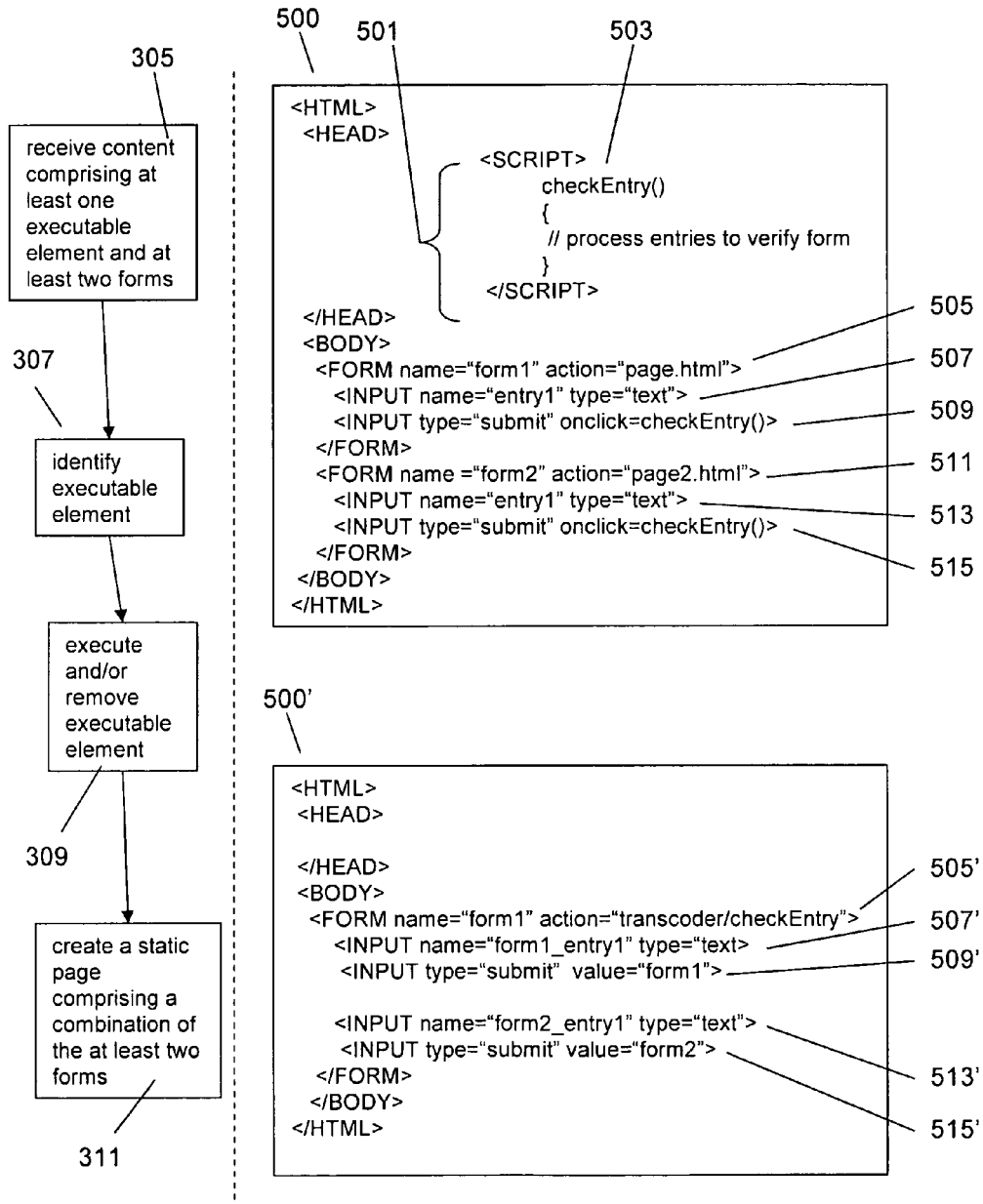
FIG. 5 is another detailed example of how dynamic content can be presented as a static page, and an accompanying flow diagram depicting the processing steps.

Referring now to FIG. 5, a detailed example of one embodiment of replacing a static element linked to an executable element with a static link referencing said executable element is shown. An initial HTML page 500 is shown. The page 500 comprises a script 501 containing a Javascript function 503; two HTML <form> elements 505, 511; two HTML text input elements 507, 513; and two HTML submit buttons 509, 515. In a standard web browser, a user could enter text into either of the text entry fields 507, 513. If the user then clicked on either of the submit buttons, the checkEntry( ) function would be called, and then the contents of the form containing the clicked submit button would be submitted to the location specified in the <form> element's "action" attribute—here "page.html" or "page2.html" depending on which submit button was clicked.

In the embodiment shown, the server 105 receives the page 500 comprising two forms 505, 511 and two static elements 509, 515 in which the two static elements 509, 515 are linked to an executable element (step 305). In the embodiment shown, the server 105 identifies the executable element 501 (step 307). The server 105 may identify the executable element 501 using any or all of the previously discussed methods for identifying an executable element.

In the embodiment shown, the server 105 then processes the executable element 501 to produce output (step 309). The processing comprises removing the executable element 501. The processing may also comprise storing a copy of said executable element 501 using any of the methods previously discussed such that the server can execute the Javascript function 503 later in response to a client request. The processing may also comprise storing a complete copy of the page or any of the page's components for later access using any of the methods previously discussed, including the use of a DOM.

In the embodiment shown, the server 105 then creates a static page 500' comprising the produced output (step 311). The created static page 500' contains no executable element, as both the script tags 501 and the Javascript function 503 have been removed. The second form element 511, has been removed, such that all the HTML input elements 507', 509', 513', 515' reside within a single HTML form element 505' The "action" attribute of the combined form has been modified to point to the link "transcoder/checkEntry." Said link comprises the word "transcoder" which may be used as a special tag to denote that the link contained in the form element 505' references an executable element. The links to the Javascript function 503 have been removed from the two form submit buttons 509', 515'. The two submit buttons 509' and 515' have also been given "value" attributes with the names of their respective forms. In the event either button is clicked on, a standard web browser will include the "value" attribute of the clicked submit button along with the form contents. By assigning unique "value" attributes to each submit button 509', 515', the server 105 may identify which button was pressed to trigger a submission.

Referring once again to FIG. 3, the server 105 may then transmit the created page 500' to a client 113 (step 313). The client 113 may then display the page or portion of a page (step 315). The client may then request a static link referencing an executable element (step 317). In a standard web browser, when either of the submit buttons 509', 515' is pressed, an HTML POST request will be sent from the browser to the address of "transcoder/checkEntry." The browser will include in the request any data corresponding to the values of the input elements 507', 509', 513', 515' in the form 405'.

In the embodiment shown in FIG. 5, the server 105 may then receive an indication that a static link has been selected (step 319). The server 105 may receive an HTTP POST request with an address of "transcoder/checkEntry" as described above.

In the embodiment shown in FIG. 5, the server 105 may then identify the executable element referenced by the requested link (step 321). Here, 'transcoder' is a word indicating that a link references an executable element. The server 105 can then recognize that the request comprising the word 'transcoder' is directed towards an executable element, and identify the specific executable element 503'. In the embodiment shown, the server may then parse the request to find the name of the referenced executable element—here checkEntry.

In the embodiment shown in FIG. 5, after identifying the referenced executable element (step 321) the server 105 may then process the executable element to produce output (step 323). The server 105 may execute the checkEntry function 503'. The server 105 may also update and/or store any variables, elements, or other data associated with executing the checkEntry function 503'. The server 105 may also retrieve a copy of the original page 500 or a DOM of the original page in order to determine any further processing. The server 105, may, after executing the checkEntry function 503' create an HTTP POST request comprising data corresponding to any or all of the form elements, and transmit said request to the address of "page.html." This additional processing would enable the form submission data to be passed back to the server designated by the original form 500'.

In the embodiment shown in FIG. 5, the server 105 may then create a static page comprising the produced output (step 325). The server 105 may create a static page comprising elements modified by the checkEntry function. The server may also create a static page comprising content received in a response to an HTTP POST request sent as part of the previous step (step 323). The static page may also comprise any or all of the elements comprising the first static page transmitted to the client (step 313).

In the embodiment shown in FIG. 5, the server 105 may then transmit the newly created static page to the client 113 (step 327). The client may then display the page (step 329).

Figure 6:
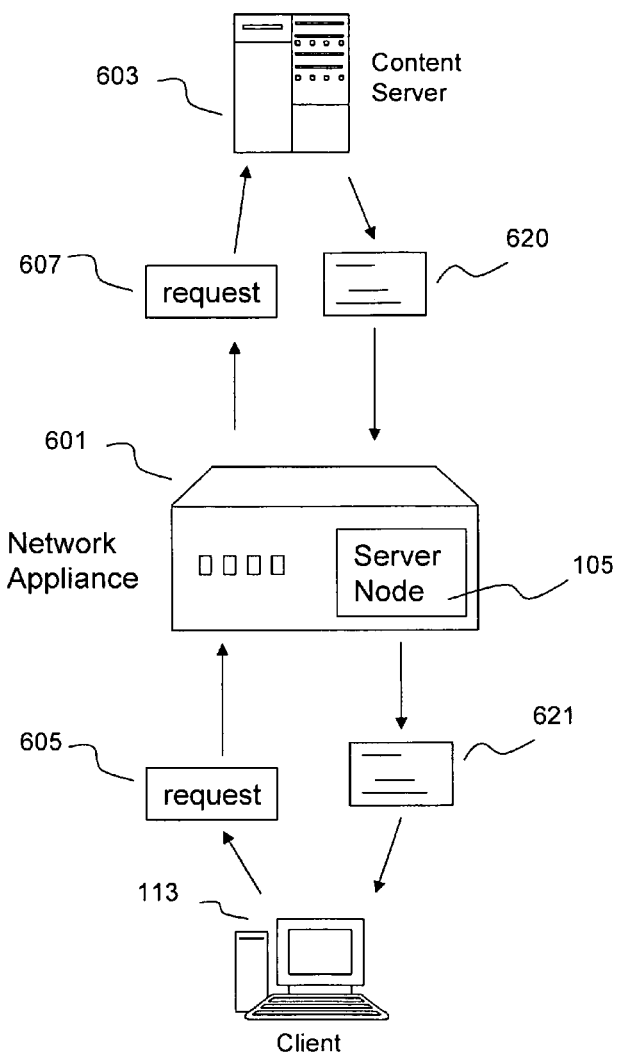
FIG. 6 is a block diagram depicting another embodiment of a client-server network.

Referring now to FIG. 6, a diagram of an embodiment in which some or all of the functionality of the server node 105 is incorporated within a network appliance 601 is shown. The sever node 105 may operate on the same or different hardware than the rest of the network appliance 601. The server node 105 may share RAM, disk space, processors, or any other computing resource with any or all of the other functionality provided in the network appliance 601.

The network appliance 601 may perform any function related to providing services to clients 113 including, without limitation, firewall services, SSL pooling and acceleration, TCP pooling and acceleration, data compression, connection monitoring, application logging, application acceleration, application delivery, load balancing, caching, virtualization, translation, redirection, connection pooling, proxy services, reverse proxy services, authentication, and session management. In the embodiment shown, said network appliance 601 receives requests from a client 113. The network appliance 601 may process requests in accordance with any of the previously described network appliance 601 functions. The network appliance 601 may also transmit some or all requests 605 to a server node 105 for processing. The network appliance 601 may also transmit requests 607 to a content server. The network appliance 601 may receive pages or portions of pages 620 from a content server 603. The network appliance may process the pages or portions of pages 620 in accordance with any of the previously described network appliance 601 functions. The network appliance 601 may also transmit some or all pages or portions of pages received to a server node 105 for processing. The network appliance 601 may also transmit pages or portions of pages 621 to a client 113.

In the embodiment shown, a content server 603 receives requests 607, and transmits pages or portions of pages of content 620. The content server 603 may be directly connected to the network appliance 601, or the content server 601 may communicate with the network appliance 603 in any of the methods previously discussed, and over any of the networks previously discussed. The content server 603 may transmit pages or portions of pages 620 written in any of the languages previously discussed, and comprising any of the elements previously discussed.

Figure 7:
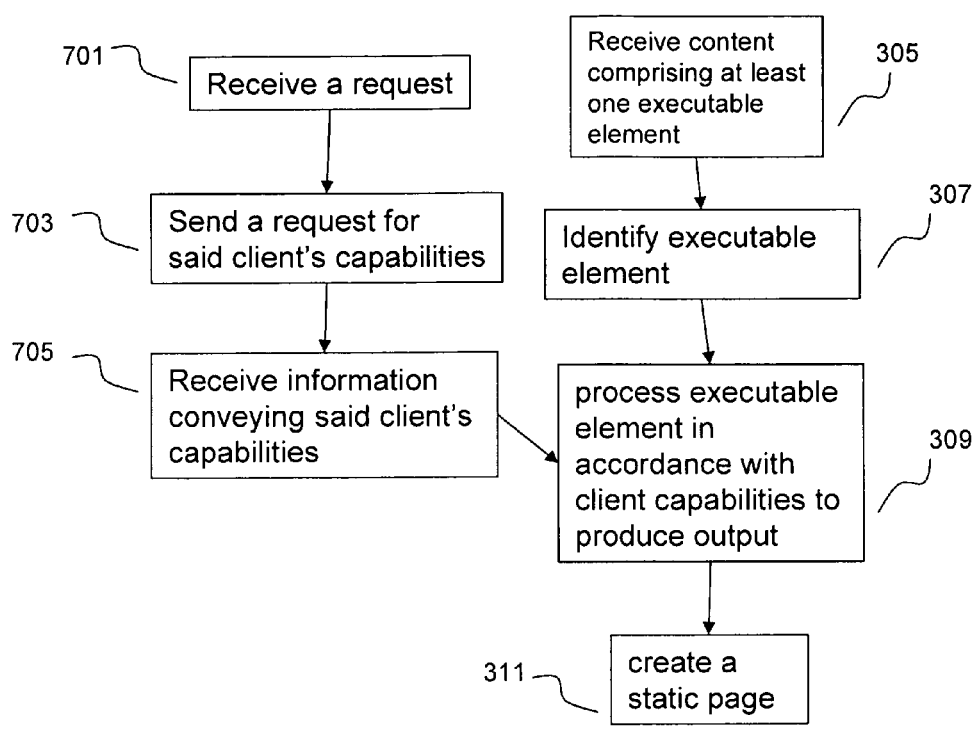
FIG. 7 illustrates an embodiment of a method for providing access to dynamic content.

Referring now to FIG. 7, one embodiment of a method for providing access to dynamic content on a network appliance 601 is shown. Said method may be performed by any of the machines or combinations of machines described above, although the embodiment below describes the method being performed by a network appliance. In brief overview, the method comprises receiving a request from a client 113 for a resource (step 701); sending a request for said client's capabilities (step 703); and receiving information conveying said client's capabilities (step 705). The method also comprises receiving a page or portion of a page of content comprising at least one static element and at least one executable element (step 305); identifying the at least one executable element (step 307); processing said at least one executable element in accordance with said client's capabilities to produce output; (step 309) and creating a static page comprising the produced output (step 311).

Still referring to FIG. 7, now in greater detail, the network appliance 601 receives a request from a client (step 701). In one embodiment receiving a request from a client (step 701) comprises receiving a request directly from a client. In other embodiments, the request from a client 113 may be received from any of the networks, connections, and appliances previously discussed. Said request may comprise any of the protocols previously discussed. In some embodiments the request may comprise the request exactly as transmitted from the client 113. In other embodiments the request may comprise a modification of an original request from a client 113. Said modifications may comprise modifications in the course of providing any of the network appliance services discussed above, and any other modifications to the content, format, protocol, addressing, headers, or other portions of the request. request from a client 113, or a new request. A request may comprise a resource directly requested by a client 113, and it may comprise a resource requested in the course of performing any service for the client 113.

After receiving a request from a client (step 701), the network appliance 601 sends a request for said client's capabilities (step 703). In one embodiment, said request may be sent to the client 113. In another embodiment, request may be sent to a collection agent as described in U.S. patent application Ser. No. 10/956,832 "A METHOD AND APPARATUS FOR ASSIGNING ACCESS CONTROL LEVELS IN PROVIDING ACCESS TO NETWORKED CONTENT FILES" whose contents are expressly incorporated herein by reference. Said collection agent may reside on the same physical machine as the network appliance sending the request, or they may reside on different physical machines. Said request may also be sent to a file, a cache, a database, a server, an executing application, or any other source of information concerning the client 113.

After sending a request for the client's capabilities (step 703) the network appliance 601 receives information conveying said clients capabilities (step 705). Said information may be received from a client 113, a collection agent, a file, a cache, a database, a server, an executing application, or any other source of information concerning the client 113. Said information may comprise, without limitation machine ID of a client node 113, operating system type, existence of a patch to an operating system, MAC addresses of installed network cards, a digital watermark on the client device, membership in an Active Directory, existence of a virus scanner, existence of a personal firewall, an HTTP header, browser type, device type, network connection information, authorization credentials, and any of the other capabilities or preferences discussed above. In some embodiments, the network appliance may store or cache said information for later retrieval.

In the embodiment shown, the network appliance 601 receives a page or portion of a page of content comprising at least one static element and at least one executable element (step 305) and identifies the at least one executable element (step 307) according to any of the embodiments previously discussed. The network appliance 601 may receive the page or portion of a page (step 305) either before or after receiving the request from a client for a resource (step 701) either before or after sending a request for said client's capabilities (step 703) and either before or after receiving information conveying said client's capabilities (step 705).

After identifying the at least one executable element (step 307), the network appliance 601 processes said at least one executable element in accordance with said client's capabilities (step 309). In some embodiments, said processing of the executable element may be responsive to information received about a client's status, preferences, or capabilities. In these embodiments the network appliance 601 may process said executable element in response to information including, without limitation, machine ID of the client node 113, operating system type, existence of a patch to an operating system, MAC addresses of installed network cards, a digital watermark on the client device, membership in an Active Directory, existence of a virus scanner, existence of a personal firewall, an HTTP header, browser type, device type, network connection information, and authorization credentials.

For example, in one embodiment, the network appliance 601 might remove executable elements that consumed large portions of RAM in accordance with information that a client 113 has limited memory capabilities. In another embodiment, the network appliance 601 might remove any executable elements that processed or transmitted sensitive information in accordance with information that a client 113 is operating on an unsafe network or computer. In still another embodiment, the network appliance 601 might remove any executable elements which might provide functionality for modification in accordance with information that a client 113 does not have authorization to modify a given page.

After processing the at least one executable element in accordance with said client's capabilities (step 309), the network appliance 601 creates a static page comprising the produced output (step 311). Said creation may be done by any of the means previously discussed. Further, said creation may also be in accordance with the information conveying said client's capabilities.

While the invention has been particularly shown and described with reference to specific preferred embodiments, it should be understood by those skilled in the art that various changes in form and detail may be made therein departing from the spirit and scope of the invention as defined by the appended claims.

We claim:

1. A method for providing access to dynamic content, the method comprising:
  (a) receiving, by a server, a page or portion of a page of content comprising an executable script and at least one static element linked to at least one executable element;
  (b) identifying, by the server, said at least one executable element;
  (c) executing, by the server, said at least one executable element to produce output;
  (d) creating, by the server, a static page of the produced output by replacing said at least one static element linked to said at least one executable element with a static link comprising a reference to said at least one executable element;
  (e) storing, by the server, the executable script and an identifier referencing the executable script;
  (f) receiving, by the server, a request from the client, the request identifying the static link referencing the executable script, the request comprising the identifier;
  (g) retrieving, by the server, the stored executable element based on the identifier; and
  (h) creating, by the server, based on the retrieved executable script a second static page.

2. The method of claim 1, wherein step (a) comprises receiving said page or portion of a page of content from a network.

3. The method of claim 1, wherein step (b) comprises identifying at least one element comprising Javascript.

4. The method of claim 1, wherein step (d) further comprises removing a link to said at least one executable element and inserting a static HyperText Markup Language (HTML) link with an attribute, the attribute comprising a notation allowing the server to identify said at least one executable element.

5. The method of claim 1, wherein step (d) further comprises removing a link to an executable element from an HTML attribute and modifying an attribute of an HTML tag to comprise a notation allowing the server to identify said at least one executable element.

6. The method of claim 1, wherein step (c) comprises removing said at least one executable element to produce output.

7. The method of claim 1, wherein step (a) comprises receiving a page or portion of a page of content comprising at least one element linked to an executable element.

8. The method of claim 7, wherein step (a) comprises receiving a page or portion of a page of content comprising at least one HTML element linked to an executable element.

9. The method of claim 7, wherein step (d) further comprises removing a link to the executable element from an HTML attribute and inserting a static HTML link with an "href" attribute.

10. The method of claim 1, further comprising the steps of:
  (e) receiving an indication that said static link has been selected;
  (f) identifying the executable element referenced by said link;
  (g) processing said executable element to produce output; and
  (h) creating a static page comprising the produced output.

11. The method of claim 1 wherein step (a) comprises receiving a page or portion of a page of content comprising at least two forms.

12. The method of claim 11, wherein step (d) comprises creating a static page comprising a combination of the at least two forms.

13. The method of claim 1, further comprising:
  (i) receiving a request from a client for a resource; and
  (ii) receiving information conveying said client's capabilities.

14. The method of claim 13, wherein step (c) comprises processing said at least one executable element in accordance with said client's capabilities.

15. The method of claim 1, further comprising:
  (i) receiving a request from a client for a resource;
  (ii) sending a request for said client's capabilities; and
  (iii) receiving information conveying said client's capabilities.

16. The method of claim 15, wherein step (c) comprises processing said at least one executable element in accordance with said client's capabilities.

17. The method of claim 1, wherein step (c) further comprises executing, by the server, said at least one executable element to produce said output and wherein the step (d) further comprises creating said static page to comprise said output from executing said at least one executable element.

18. The method of claim 1, further comprising
  transmitting, by the server, said static page to a client; and
  transmitting, by the server, said output and said at least one executable element to said client responsive to an indication from said client that said static link referencing said at least one executable element from said static page has been selected.

19. A server system for providing access to dynamic content, said server system comprising:
(a) a storage buffer of a server which receives a page or portion of a page of content
comprising an executable script and at least one static element linked to at least one executable element;
(b) a processor of the server in communication with said storage buffer which identifies
said at least one executable element, executes said at least one executable element to produce output, and creates a static page of the produced output by replacing said at least one static element linked to said at least one executable element with a static link comprising a reference to said at least one executable element, stores the executable script and an identifier referencing the executable script and receives from a client a request comprising the identifier and identifying the static link referencing the executable script;
and wherein the processor retrieves the stored executable element based on the identifier and creates a second static page based on the retrieved executable script.

20. The server system of claim 19, wherein said storage buffer receives said page or portion of a page of content from a network.

21. The server system of claim 19, wherein said processor removes a link to said at least one executable element and inserts a static HyperText Markup Language (HTML) link with an attribute, the attribute comprising a notation allowing the server to identify said at least one executable element.

22. The server system of claim 19, further comprising a transmitter which sends said static page to a client.

23. The server system of claim 19, wherein said processor further removes a link to an executable element from an HTML attribute and modifies an attribute of an HTML tag to comprise a notation allowing the server to identify said at least one executable element, wherein said processor executes at least one of said executable elements to produce output.

24. The server system of claim 19, wherein said processor removes at least one executable element to produce output.

25. The server system of claim 19, wherein said storage buffer receives a page or portion of a page of content comprising at least one element linked to an executable element.

26. The server system of claim 25, wherein said storage buffer receives a page or portion of a page of content comprising at least one HTML element linked to an executable element.

27. The server system of claim 25, wherein said processor removes a link to the executable element from an HTML attribute and inserts a static HTML link with an "href" attribute.

28. The server system of claim 27, further comprising:
an input which receives an indication that said static link has been selected.

29. The server system of claim 19 wherein said storage buffer receives a page or portion of a page of content comprising at least two forms.

30. The server system of claim 29, wherein said processor creates a static page comprising a combination of the at least two forms.

31. A system for providing access to dynamic content, said system comprising:
a storage buffer of a server receiving a page or portion of a page of content comprising an executable script and at least one static element linked to at least one executable element;
a processor of the server in communication with said storage buffer which identifies said at least one executable element, executes said at least one executable element to produce output, and creates a static page of the produced output by replacing said at least one static element linked to said at least one executable element with a static link comprising a reference to said at least one executable element; and
wherein the server stores the executable script and an identifier referencing the executable script, transmits the static page to a client, receives a request identifying the static link referencing the executable script from a client, the request comprising the identifier, retrieves the stored executable element based on the identifier, creates a second static page based on the retrieved executable script and transmits the second static page to the client.

32. The system of claim 31, wherein the server removes a link to said at least one executable element and inserts a static HyperText Markup Language (HTML) link with an attribute, the attribute comprising a notation allowing the server to identify said at least one executable element.

33. The system of claim 31, wherein the server removes a link to an executable element from an HTML attribute and modifies an attribute of an HTML tag to comprise a notation allowing the server to identify said at least one executable element.

34. The system of claim 31, wherein the server for transmits said static page to a client, said static page enabling the user to request the static link via a script of the client.

35. The system of claim 31, wherein the storage buffer stores a copy of said executable element to execute a function responsive to a client request.

36. The system of claim 31, wherein the processor removes the executable script to produce output.

37. The system of claim 31, wherein the server for receives at least one additional element linked to the executable element.

38. The system of claim 37, wherein the one additional element comprises an HTML element linked to the executable element.

39. The system of claim 37, wherein the processor removes a link to the executable element from an HTML attribute and inserts a static HTML link with an "href" attribute.

40. The system of claim 39, wherein the server
receives an indication that said static link has been selected, identifies the executable element referenced by said link, processes said executable element to produce output, and creates static page comprising the produced output.

41. The system of claim 31 wherein the server receives a page or portion of a page of content comprising at least two forms.

42. The system of claim 41, wherein the processor creating a static page comprising a combination of said at least two forms.

43. A method for providing access to dynamic content via a static web page, the method comprising:
(a) receiving, by a server, content of a web page comprising a static element that includes a link for accessing an executable script;
(b) identifying, by the server, the executable script within the content of the page;
(c) executing, by the server, the executable script to produce an output displayed by executing the executable script;
(d) creating, by the server, a static page of the produced output by replacing the link for accessing the executable script with a static link referencing the executable script;
(e) storing, by the server, the executable script and an identifier referencing the executable script;

(f) transmitting, by the server, the static page to a client;
(g) receiving, by the server, a request from the client, the request identifying the static link referencing the executable script, the request comprising the identifier;
(h) retrieving, by the server, the stored executable element based on the identifier;
(i) creating, by the server, based on the retrieved executable script a second static page;
(j) transmitting, by the server, the second static page to the client.

* * * * *